(12) United States Patent
Burns Baker

(10) Patent No.: US 9,402,369 B2
(45) Date of Patent: Aug. 2, 2016

(54) PET RESTING DEVICE FOR A VEHICLE WINDOW

(75) Inventor: Kimberly Burns Baker, Homewood, IL (US)

(73) Assignee: Kimberly Burns, Homewood, IL (US)

( * ) Notice: Subject to any disclaimer, the term of this patent is extended or adjusted under 35 U.S.C. 154(b) by 206 days.

(21) Appl. No.: 13/476,018

(22) Filed: May 21, 2012

(65) Prior Publication Data

US 2015/0173325 A1    Jun. 25, 2015

(51) Int. Cl.
| | |
|---|---|
| *A01K 1/035* | (2006.01) |
| *B60J 11/06* | (2006.01) |
| *B60R 7/04* | (2006.01) |
| *B60N 2/46* | (2006.01) |

(52) U.S. Cl.
CPC ............. *A01K 1/035* (2013.01); *B60J 11/06* (2013.01); *B60R 7/046* (2013.01); *B60N 2/4666* (2013.01); *B60N 2/4673* (2013.01)

(58) Field of Classification Search
CPC ... A01K 1/035; A01K 1/0272; A01K 1/0035; B60J 5/0493; B60J 11/025; B60J 11/06; B60R 7/046
USPC .................. 296/1.07, 146.7, 146.9, 152, 153; 119/496, 706, 712, 756, 771
See application file for complete search history.

(56) References Cited

U.S. PATENT DOCUMENTS

| | | | | | |
|---|---|---|---|---|---|
| 6,000,365 | A | * | 12/1999 | Charnesky | ..................... 119/712 |
| 6,079,370 | A | * | 6/2000 | Al-Birmani et al. | .......... 119/771 |
| 2007/0283898 | A1 | * | 12/2007 | Madison | ....................... 119/496 |
| 2008/0000428 | A1 | * | 1/2008 | Cody et al. | ................... 119/28.5 |
| 2011/0080015 | A1 | * | 4/2011 | Spiegel et al. | ............... 296/1.07 |

* cited by examiner

*Primary Examiner* — Jason S Daniels

(74) *Attorney, Agent, or Firm* — Bryan Wallace

(57) ABSTRACT

A device for connecting to a window comprising a unitary support member configured for secure engagement with an interior portion of a door and a cushioning member removably attached to the support member.

1 Claim, 2 Drawing Sheets

PET RESTING DEVICE FOR A VEHICLE WINDOW

FIELD OF THE INVENTION

The present invention relates to a device for enabling a pet to rest on an open window of a vehicle. More particularly, the present invention relates to a removable and interchangeable device, configured for secure engagement with an interior vehicle door, such that the pet can comfortably rest itself on an open vehicle window.

BACKGROUND OF THE INVENTION

Devices that enable a pet or animal to lean or rest itself on the door opening in a window are generally known in the art. U.S. Pat. No. 6,000,365 to Charnesky illustrates a Paw Pad that engages the interior and exterior portion of a vehicle door having two pieces for connection to the door and engages the interior and exterior of the door for engagement with the door. U.S. Pat. No. 7,404,589 is a Combination Draping Canine Fabric Article and Seat Cover for Use with a Vehicle.

The above-mentioned devices are suitable for their intended purposes, however the above do not provide a device with a unitary support member with a removable cushion that securely engages a door interior for a door to rest its paws on the door. The present invention provides a removable cushion and securely engages the interior of the door only, thereby overcoming deficiencies in the above-mentioned inventions.

SUMMARY OF THE INVENTION

The pet resting device for a vehicle window comprises a unitary support member configured for engagement with an interior portion of a door and a cushioning member removably attached to the support member. The support member comprises a handle, enabling a user to open and close the door when the device is in a connected position with the door. The support member comprises a leash connecting device for securing an animal to the interior of the car. The cushioning member and support member are detachable The cushioning member and support member are connectable using VELCRO brand hook and loop fasteners.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIG. 1 illustrates an example of an interior of a vehicle with the pet resting device for a vehicle window affixed thereto;

FIG. 2 further illustrates the pet resting device connected to a vehicle interior;

FIG. 3 is an exploded view of the pet resting device showing the support member and cushioning member; and, FIG. 4 is side view of the pet resting device and example vehicle door, illustrating the affixed connection to the door.

Similar reference characters denote corresponding features consistently throughout the attached drawings.

DETAILED DESCRIPTION OF THE DRAWINGS

Particular embodiments of the present invention will now be described in greater detail with reference to the figures.

Figure 1:
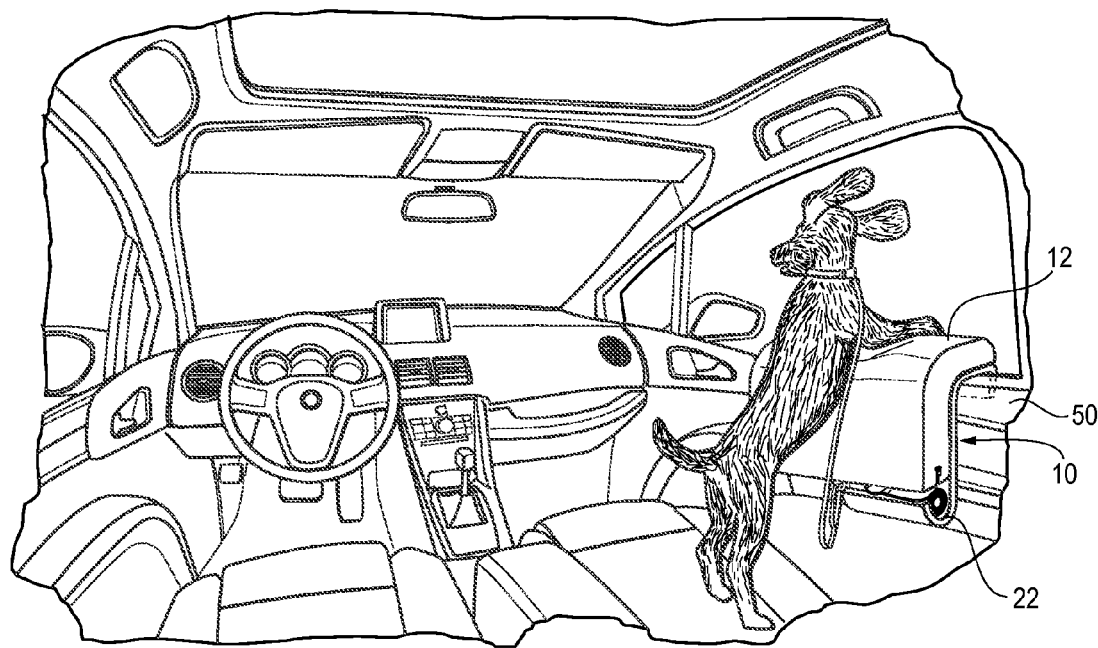
FIGS. 1-4A illustrate several views of the Pet Resting Device for a Vehicle Window, in accordance with the present invention.
Figure 2:
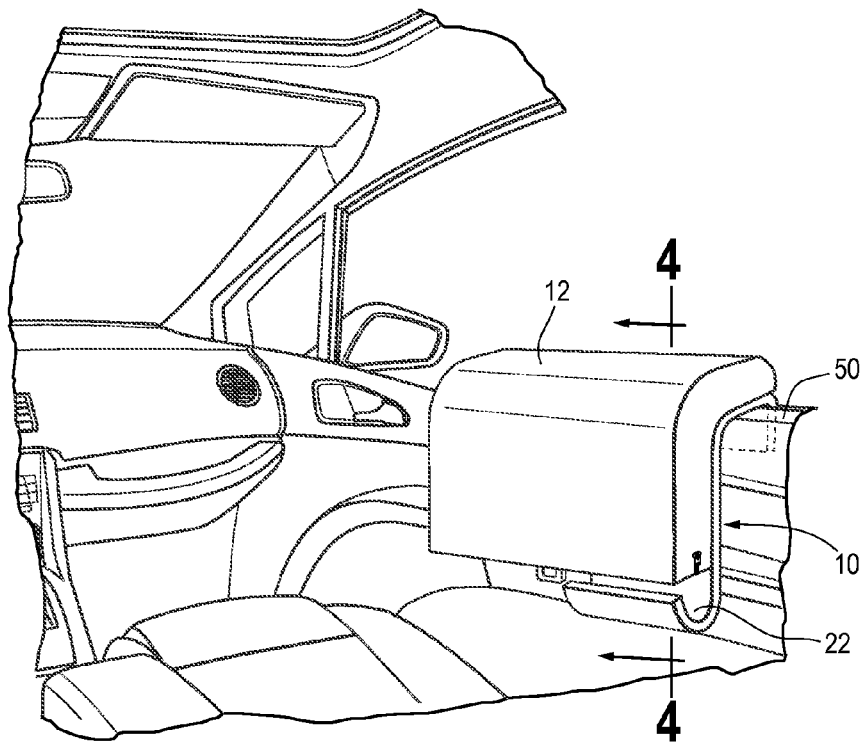
Figure 3:
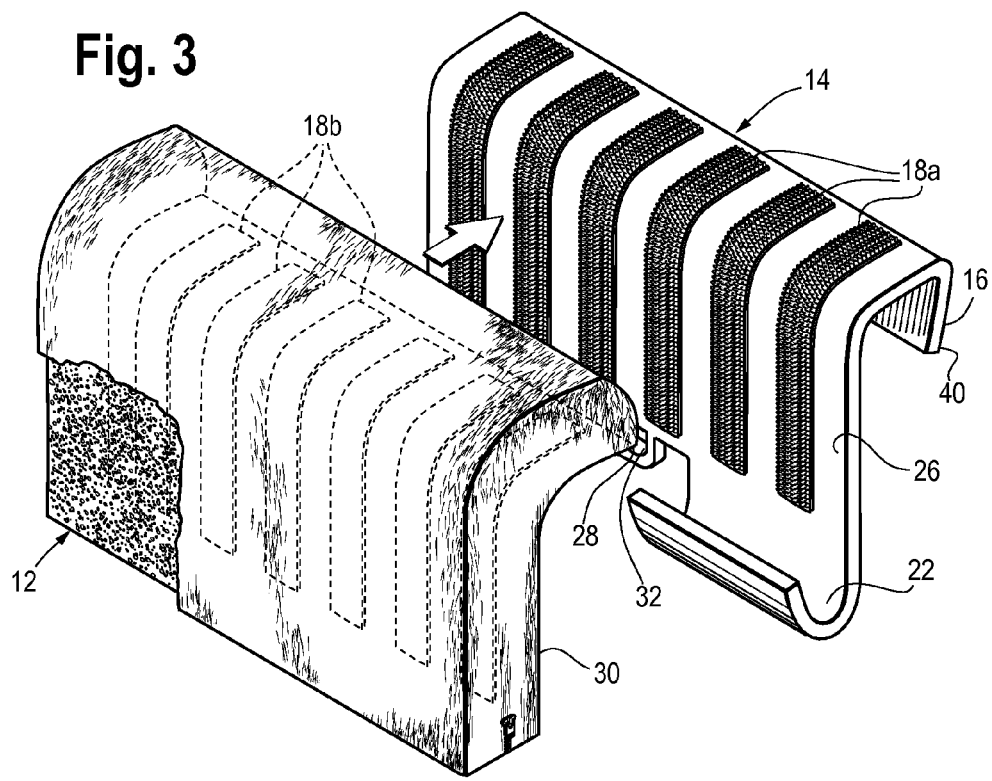

Referring now to FIGS. 1-3, there is shown a pet resting device 10, in accordance with the present invention. As shown in FIG. 1, there is shown an example of an interior of a vehicle with the pet resting device 10 connected thereto, in accordance with the present invention. As shown the device 10 is fitted to the interior door 50 of the vehicle with the window in a generally open position, such that a pet or animal can stand on an interior portion of the vehicle and rest its paws/legs on the resting device 10. As shown in FIG. 2, there is shown an interior of the vehicle with the device 10 positioned on the interior of the door 50. As shown in FIGS. 2 and 3, the resting device 10 is positioned on the front right or passenger side of the interior of the vehicle, however notably it is contemplated that the device 10 is interchangeable for positioning on the interior of any side or door, front or back, including left and right side door 50, without departing from the scope of the present invention.

In FIG. 3, there is shown an exploded view of the pet resting device 10. As shown, the device 10 comprises a cushion member 12 and a support member 14. The cushion member 12 has an outer skin 30 and contoured configuration for providing comfortable tactile engagement with an animal. In the present embodiment it is contemplated that the cushion member 12 is comprised of a generally foam like composition. However, notably it is further contemplated that the cushion member 12 can be comprised of other soft type materials such as cotton, feathers or the like. The cushion member 12 is attached to the support member 14 generally along the outer surface 26 of the support member 14. The cushion member 12 is detachable to the supporting member 14 general along the outer surface of the support member 14.

As shown in FIG. 3, the outer surface of the support member 14 has a formation of connecting members 18a, formed along the outer surface for connection connecting members 18b formed along the inner surface 30 of the cushion member 12. As shown, in the present invention, the connecting members 18a and 18b are VELCRO brand hook and loop fasteners. Further the members 18a extend from an uppermost portion of the body of the support member along the exterior 26 to a lower portion of the body. As further shown, in the present embodiment, six (6) VELCRO brand hook and loop fasteners members 18a and 18b are provided positioned generally parallel to each other across the body of the support member 14. Notably it is contemplated that other formations or patterns of the VELCRO brand hook and loop fasteners members 18a and 18b are contemplated, as well as, the number of VELCRO brand hook and loop fasteners members provided to provide optimal engagement between the support member 14 and cushion member 12, without departing from the scope of the present invention.

As shown in FIGS. 1-4, 4A, the support member 14 is configured and dimensioned for secured engagement with the interior of a vehicle door and is further configured for interchangeable connection to the interior of the front, back, left or right interior side of a vehicle.

Figure 4:
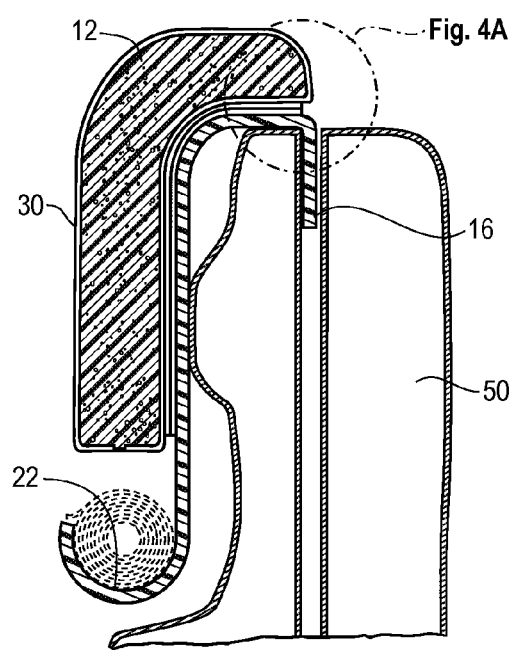
Figure 4A:
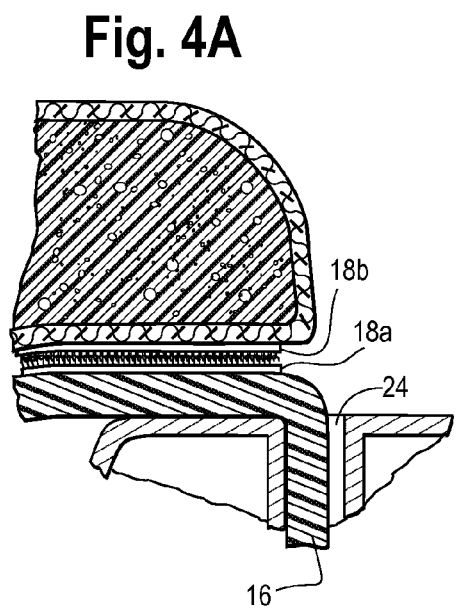

The support member 14 further comprises a notch 40 engaging member, a collar securing member 28 and a handle 22. As shown in FIG. 4, the notch 40 locking mechanism is dimensioned for engagement with the opening 24 formed in the upper interior of most vehicle doors. As shown in FIGS. 4 and 4A, the notch 40 is dimensioned with the length about 3½-4 inches such that the notch 40 extends about 3½-4 inch into the door 52. The notch 40 has a width of ⅛ an inch enabling the notch 40 to be securely fitted into the opening 24 of the door 42 thereby locking the door cushion device 10 in place with the interior of the vehicle. In an engaged position, the body inner surface 20 of the support member 14 engages the interior of the door 52.

The handle 22 is formed generally at the lower portion of the support member 14, and is configured to enable a user to grip the door. As such, the handle 22 enables the user to open and close the door from the inside when the device 10 is fully engaged with the door.

The support member 14 further comprises a leash connector 28 for securing the animal or pet to the device 10 such that the pet can be secured to the interior of the vehicle. In the present embodiment the leash connector 28 has an opening 32 formed therein, for receiving an inserted leash and tying the leash to the device 10. In another embodiment, it is contemplated that the connector 28 can be a hook or any other device capable of securing a leash to the support member 14.

Reference to various embodiments, it is understood that the words which have been used herein are words of description and illustration, rather than words of limitation. Further, although the invention has been described herein with reference to particular means, materials, and embodiments, the invention is not intended to be limited to the particulars disclosed herein; rather, the invention expands to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

What is claimed is:

1. A vehicle pet resting device to be used with a vehicle door, comprising:
    a unitary support member having an arcuate configuration facilitating engagement to an opening formed at the top of an inner door trim panel of the vehicle door,
    a cushioning member removably attached to the support member, wherein the cushioning member extends along the support member, from the top of the inner door trim panel and along an interior portion to protect the pet from engagement with the interior portion of the door,
    a handle member formed below the cushioning member configured to allow a user to pull on the pet resting device to open and close the door, the handle member having an arcuate shape configured to hold an object or cylindrical member therein and;
    a leash connector formed below the cushioning member configured to receive a pets leash therein to secure a pet inside of the vehicle.

* * * * *